United States Patent
Abrol et al.

(10) Patent No.: US 10,006,330 B2
(45) Date of Patent: Jun. 26, 2018

(54) SYSTEM AND METHOD FOR EMISSIONS CONTROL IN GAS TURBINE SYSTEMS

(71) Applicant: GENERAL ELECTRIC COMPANY, Schenectady, NY (US)

(72) Inventors: Sidharth Abrol, Bangalore (IN); Rajeeva Kumar, Broomfield, CO (US); Mustafa Tekin Dokucu, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 829 days.

(21) Appl. No.: 14/526,223

(22) Filed: Oct. 28, 2014

(65) Prior Publication Data
US 2016/0115839 A1  Apr. 28, 2016

(51) Int. Cl.
| | |
|---|---|
| F01N 3/20 | (2006.01) |
| G05B 15/02 | (2006.01) |
| B01D 53/86 | (2006.01) |

(52) U.S. Cl.
CPC ......... F01N 3/208 (2013.01); B01D 53/8625 (2013.01); B01D 53/8696 (2013.01);
(Continued)

(58) Field of Classification Search
CPC .. F01N 3/208; F01N 2610/02; F01N 2560/00; F01N 2900/14; B01D 53/8696; B01D 53/8625; B01D 2251/2062; Y02T 10/24; Y02T 50/677; G05B 15/02; F23J 2219/10; F23N 2041/20
(Continued)

(56) References Cited

U.S. PATENT DOCUMENTS 5,628,184 A  5/1997  Santos
6,397,582 B1  6/2002  Hanaoka et al.
(Continued)

FOREIGN PATENT DOCUMENTS

EP  1788309 A2 *  5/2007  ............. F23N 5/003
EP  2088288 A2 *  8/2009  ............ H04B 17/345

OTHER PUBLICATIONS

Prabhakar, S., et al.; "Control of emission characteristics by using Selective Catalytic Reduction (SCR) in D.I. diesel engine," Nov. 25-27, 2010, 3 pgs.
(Continued)

*Primary Examiner* — Jason T Newton
(74) *Attorney, Agent, or Firm* — John P. Darling (57) ABSTRACT

A system includes an emissions control system. The emissions control system includes a processor programmed to receive one or more selective catalytic reduction (SCR) operating conditions for an SCR system. The SCR system is included in an aftertreatment system for an exhaust stream. The processor is also programmed to receive one or more gas turbine operating conditions for a gas turbine engine. The gas turbine engine is configured to direct the exhaust stream into the aftertreatment system. The processor is further programmed to derive a $NH_3$ flow to the SCR system based on an SCR model and the one or more SCR operating conditions, to derive a NO/NOx ratio, and to derive a fuel split for the gas turbine engine based on the $NH_3$ flow, the NO/NOx ratio, or a combination thereof.

20 Claims, 7 Drawing Sheets

(52) U.S. Cl.
CPC ...... *G05B 15/02* (2013.01); *B01D 2251/2062* (2013.01); *F01N 2560/00* (2013.01); *F01N 2610/02* (2013.01); *F01N 2900/14* (2013.01); *F23J 2219/10* (2013.01); *F23N 2041/20* (2013.01); *Y02T 10/24* (2013.01); *Y02T 50/677* (2013.01)

(58) Field of Classification Search
USPC .......................................................... 60/776
See application file for complete search history.

(56) References Cited

U.S. PATENT DOCUMENTS

| | | | |
|---|---|---|---|
| 6,823,675 B2 | 11/2004 | Brunell et al. | |
| 7,003,944 B2 | 2/2006 | Surnilla et al. | |
| 7,090,811 B2 | 8/2006 | Cho et al. | |
| 7,093,427 B2 | 8/2006 | Van Nieuwstadt et al. | |
| 7,166,262 B2 | 1/2007 | Buzanowski | |
| 7,188,465 B2* | 3/2007 | Kothnur | F02C 7/222 60/39.281 |
| 7,284,378 B2* | 10/2007 | Amond, III | F02C 9/34 60/39.27 |
| 7,631,500 B2* | 12/2009 | Mueller | F23R 3/286 239/399 |
| 7,776,280 B2 | 8/2010 | Telford | |
| 7,799,289 B2 | 9/2010 | Robel | |
| 7,822,512 B2 | 10/2010 | Thatcher et al. | |
| 7,824,636 B1 | 11/2010 | Kraemer et al. | |
| 8,010,236 B2 | 8/2011 | Jambhekar et al. | |
| 8,056,322 B2 | 11/2011 | Winkler et al. | |
| 8,151,571 B2 | 4/2012 | Maly et al. | |
| 8,230,677 B2 | 7/2012 | Devarakonda et al. | |
| 8,584,444 B2 | 11/2013 | Hoskin | |
| 2005/0282285 A1 | 12/2005 | Radhamohan et al. | |
| 2008/0098728 A1* | 5/2008 | Winkler | F01N 3/106 60/286 |
| 2010/0050614 A1* | 3/2010 | Parmentier | F01N 3/208 60/287 |
| 2010/0300108 A1* | 12/2010 | Demougeot | F02C 7/228 60/773 |
| 2011/0192147 A1 | 8/2011 | Hoskin | |
| 2012/0317989 A1 | 12/2012 | Hoskin | |
| 2013/0098462 A1 | 4/2013 | Hoskin | |
| 2014/0075954 A1 | 3/2014 | Tralshawala et al. | |
| 2015/0020529 A1* | 1/2015 | Hoskin | F02C 3/30 60/772 |
| 2015/0020530 A1* | 1/2015 | Pandey | F01N 3/208 60/772 |
| 2015/0190749 A1* | 7/2015 | Williams | F01N 3/208 422/83 |
| 2016/0115839 A1* | 4/2016 | Abrol | F01N 3/208 60/776 |
| 2016/0138808 A1* | 5/2016 | Huebner | F23R 3/34 60/734 |
| 2017/0089266 A1* | 3/2017 | Alexander | F02C 7/228 |
| 2017/0122222 A1* | 5/2017 | Punjala | F02C 3/04 |

OTHER PUBLICATIONS

Marinov, N., et al.; "An experimental and kinetic calculation of the promotion effect of hydrocarbons on the NO—NO2 conversion in a flow reactor," Twenty-Seventh Symposium (International) on Combustion/The Combustion Institute, ScienceDirect, vol. 27, Issue 1, pp. 389-396, 1998.

* cited by examiner

SYSTEM AND METHOD FOR EMISSIONS CONTROL IN GAS TURBINE SYSTEMS

BACKGROUND

The subject matter disclosed herein relates to gas turbine systems and, more particularly, to a system and method for improving the control of emissions in a gas turbine system.

Gas turbine systems, such as a gas turbine providing power in a power plant, typically include at least one gas turbine engine having a compressor, a combustor system, and a turbine. The combustor system combusts a mixture of fuel and compressed air to generate hot combustion gases, which, in turn, drive blades of the turbine, for example, to produce rotative power. Exhaust gas produced by the gas turbine engine may include certain byproducts, such as nitrogen oxides ($NO_x$, including NO and $NO_2$), sulfur oxides ($SO_x$), carbon oxides ($CO_x$), and unburned hydrocarbons. An aftertreatment system fluidly coupled to the exhaust gas may be used to reduce the amount of such byproducts in the exhaust gas. For example, a selective catalytic reduction (SCR) system may be included in the aftertreatment system to reduce $NO_x$ emissions. It would be beneficial to improve control of the emissions.

BRIEF DESCRIPTION

Certain embodiments commensurate in scope with the present disclosure are summarized below. These embodiments are not intended to limit the scope of the claims, but rather these embodiments are intended only to provide a brief summary of certain embodiments. Indeed, embodiments of the present disclosure may encompass a variety of forms that may be similar to or different from the embodiments set forth below.

In one embodiment, a system includes an emissions control system. The emissions control system includes a processor programmed to receive one or more selective catalytic reduction (SCR) operating conditions for an SCR system. The SCR system is included in an aftertreatment system for an exhaust stream. The processor is also programmed to receive one or more gas turbine operating conditions for a gas turbine engine. The gas turbine engine is configured to direct the exhaust stream into the aftertreatment system. The processor is further programmed to derive a $NH_3$ flow to the SCR system based on an SCR model and the one or more SCR operating conditions, to derive a $NO/NO_x$ ratio, and to derive a fuel split for the gas turbine engine based on the $NH_3$ flow, the $NO/NO_x$ ratio, or a combination thereof.

In another embodiment, a method includes receiving one or more selective catalytic reduction (SCR) system operating conditions for an SCR system. The SCR system is included in an aftertreatment system for an exhaust stream. The method also includes receiving one or more gas turbine operating conditions for a gas turbine engine. The gas turbine engine is configured to provide the exhaust stream into the aftertreatment system. The method further includes deriving a $NH_3$ flow to the SCR system based on an SCR model and the one or more SCR operating conditions, deriving a $NO/NO_x$ ratio, and deriving a fuel split for the gas turbine engine based on the $NH_3$ flow, the $NO/NO_x$ ratio, or a combination thereof.

In another embodiment, a system includes a gas turbine engine configured to combust a fuel to produce a first power, a bottoming cycle fluidly coupled to the gas turbine engine and configured to receive an exhaust stream of the gas turbine engine to produce a second power, a selective catalyst reduction (SCR) system disposed in the bottoming cycle and configured to receive the exhaust stream and to remove $NO_x$ from the exhaust stream, and a controller including a processor. The processor is programmed to receive one or more SCR system operating conditions, to receive one or more gas turbine operating conditions, to derive a $NH_3$ flow to the SCR system based on an SCR model and the one or more SCR operating conditions, to derive a $NO/NO_x$ ratio, and to derive a fuel split for the gas turbine engine based on the $NH_3$ flow, the $NO/NO_x$ ratio, or a combination thereof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Provided herein are techniques for controlling emissions and, more specifically, $NO_x$ emissions, of a gas turbine system. In the gas turbine system, one or more gas turbine engines may combust a fuel to produce combustion gases for driving one or more turbine stages, each having a plurality of blades. Depending on the type of fuel that is combusted, exhaust emissions resulting from the combustion process may include nitrogen oxides ($NO_x$, including NO and $NO_2$), sulfur oxides ($SO_x$), carbon oxides ($CO_x$), and unburned hydrocarbons. Often, the composition of exhaust gases released by the gas turbine system, such as a gas turbine power plant, is subject to regulatory requirements. By way of example, regulations may require that the $NO_x$ composition of the exhaust gas that is released into the atmosphere is no greater than a threshold level, such as 10 parts-per-million (ppm).

One technique for removing or reducing the amount of $NO_x$ in an exhaust gas stream is using an SCR system. In the SCR system, a reductant, such as ammonia ($NH_3$) or urea, is injected into the exhaust gas stream and reacts, in the presence of one or more catalysts, with the $NO_x$ to produce nitrogen ($N_2$) and water ($H_2O$). The effectiveness of the SCR system (e.g., $DeNO_x$ efficiency) may be at least partially dependent upon the amount of the reductant injected into the exhaust gas stream. However, when the reductant is over-injected into the exhaust gas stream, the excess reductant may not react with $NO_x$. As a result, an amount of the reductant may "slip" or pass through the SCR system unreacted. The effectiveness of the SCR system (e.g., $DeNO_x$ efficiency) may also be at least partially dependent upon an operating temperature of the SCR system as well as gas composition of $NO_x$ (e.g., $NO/NO_2$ ratio) at the inlet of the SCR system.

Another technique for removing or reducing the amount of $NO_x$ (or other emissions compound) in an exhaust gas stream is by regulating operation of the gas turbine engine. For example, a fuel-to-air ratio in the combustor of the gas turbine engine may be regulated to maintain a low flame temperature within the combustor to reduce $NO_x$ emissions. For further example, as the gas turbine engine may include multiple fuel circuits, each of which controls fuel flow rate at one or more fuel nozzles depending on the operating conditions of the gas turbine engine, a fuel split (e.g., division of the fuel within the multiple fuel circuits) may be regulated to reduce $NO_x$ emissions. However, certain fuel split schemes employed by the gas turbine engine, aiming to remove or reduce the amount of $NO_x$ in the exhaust gas stream, may produce an exhaust gas with gas composition of $NO_x$ (e.g., $NO/NO_2$ ratio) that is not as optimal for the SCR system, thereby affecting the overall effectiveness of the emissions control of the gas turbine system.

As such, in accordance with embodiments of the present disclosure, a gas turbine system that includes a gas turbine engine and a downstream SCR system may include a control system configured to regulate and coordinate the emissions control of the gas turbine engine and the SCR system to achieve a desired overall emissions produced by the gas turbine system. This technique is especially useful during a startup of the gas turbine system. For example, as will be discussed in greater detail below, the control system may regulate a fuel split in the combustor of the gas turbine engine to change the composition of the exhaust gas (e.g., the exhaust gas produced by the gas turbine engine and subsequently sent to the SCR system for aftertreatment), especially $NO/NO_2$ ratio, for improved $DeNO_x$ efficiency of the downstream SCR system, thereby improving the overall effectiveness of $NO_x$ emissions control for the gas turbine system (e.g., including both the gas turbine engine and the downstream SCR system).

In accordance with the embodiments of the present disclosure, a control system of a gas turbine system is configured to receive one or more SCR operating conditions (e.g., ammonia flow rate, operating temperature, inlet $NO_x$ concentration, etc.) for an SCR system included in an aftertreatment system for treating an exhaust stream produced by a gas turbine engine. The control system is also configured to receive one or more gas turbine operating conditions (e.g., fuel split, firing temperature, outlet gas flow rate, etc.) for the gas turbine engine. Based on a SCR model and the received one or more SCR operating conditions, the control system may derive an $NH_3$ flow to the SCR system. Further, based on the derived $NH_3$ flow and other characteristics of the SCR system (e.g., a SCR map), the control system may derive an $NO/NO_x$ ratio, and based on which, a fuel split for the gas turbine engine. As such, the overall $NO_x$ emissions from the gas turbine system may be effectively removed or reduced.

Further, in accordance with the present disclosure, some embodiments include a model-based estimator (e.g., an extended Kalman filter) to estimate parameters (e.g., catalyst aging factor) for the SCR model. The estimator may calibrate the SCR model online by tuning the parameters in real time to match model predictions with actual SCR system measurements on $NO_x$ and $NH_3$ slip. Such techniques may be used to tune the SCR model for different catalyst characteristics, resulting in more flexible implementation of a SCR model (e.g., to different SCR systems) and more accurate and robust emissions control that utilizes the SCR model.

Figure 1:
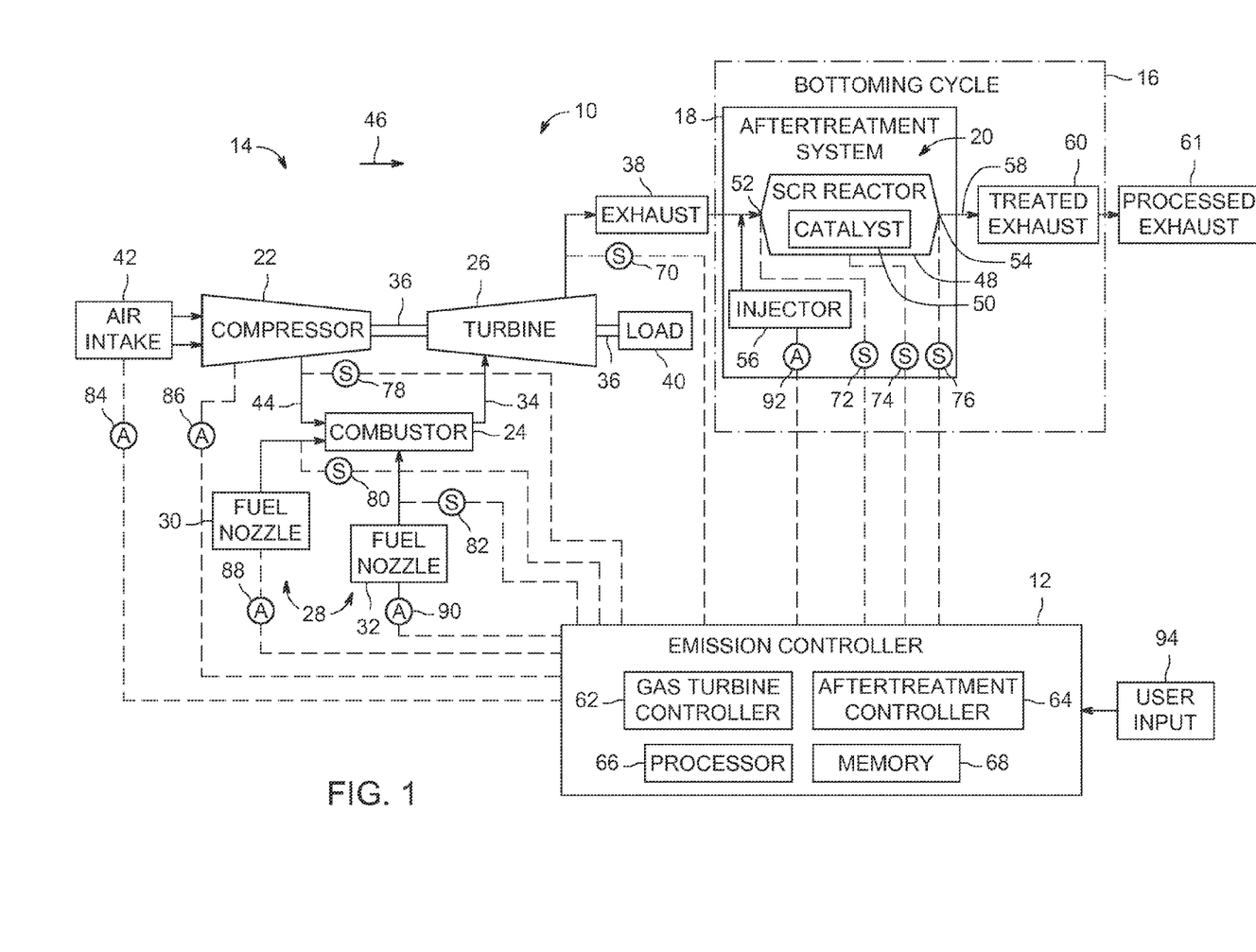
FIG. 1 is a block diagram of a gas turbine system that includes an emission controller for controlling emissions of the gas turbine system, in accordance with embodiments of the present disclosure.

With the foregoing in mind, FIG. 1 is a block diagram of a gas turbine system 10 that includes an emission controller 12, in accordance with the present disclosure, for controlling emissions of the turbine system 10. The gas turbine system 10 includes a gas turbine engine 14 and a bottoming cycle 16 including an aftertreatment system 18. The gas turbine engine 14 may include, but is not limited to, a simple cycle heavy-duty gas turbine system or an aircraft engine derivative combustion system. The aftertreatment system 18 may include an SCR system 20 to reduce $NO_x$ emissions from the gas turbine engine. The bottoming cycle 16 is configured to utilize heat (e.g., waste heat from exhaust) generated by the gas turbine engine 14 to generate electrical power and may include other components, such as a waste heat recovery boiler and a steam turbine.

The gas turbine engine 14 includes a compressor 22, a turbine combustor 24, and a turbine 26. The turbine combustor 24 include fuel nozzles 28 that route a liquid fuel and/or gas fuel, such as diesel, natural gas or syngas, into the turbine combustor 24. As shown, the turbine combustor 24 may have multiple fuel nozzles 28. More specifically, the turbine combustor 24 may include a primary fuel injection system having primary fuel nozzles 30 and a secondary fuel injection system having secondary fuel nozzles 32. The fuel may be delivered between the primary fuel nozzles 30 and the secondary fuel nozzles 32 (e.g., a fuel split) with any suitable split ratio. As discussed in more detail below, the emission controller 12 may regulate and adjust the fuel split for $NO_x$ emissions control of the gas turbine system 10. In the illustrated embodiment, the gas turbine engine 14 includes one turbine combustor 24, however, it should be noted that the gas turbine engine 14 may include any number of the turbine combustors 24. In addition, it should be noted that each turbine combustor 24 may include more than two fuel injection systems with any suitable fuel splits as desired. In the embodiments where the gas turbine engine 14 includes more than one turbine combustor 24, the fuel split also includes delivering the fuel among the multiple turbine combustors 24 in addition to between/among the fuel nozzles for each turbine combustor 24.

The turbine combustor 24 ignite and combust an air-fuel mixture, and then pass hot pressurized combustion gases 34 (e.g., exhaust) into the turbine 26. Turbine blades of the turbine 26 are coupled to a shaft 36, which is also coupled to several other components throughout the gas turbine engine 14. As the combustion gases 34 pass through the turbine blades in the turbine 26, the turbine 26 is driven into rotation, which causes the shaft 36 to rotate. Eventually, the combustion gases 34 exit the gas turbine engine 14 as a stream of exhaust gas 38. Further, the shaft 36 may be coupled to a load 40, which is powered via rotation of the shaft 36. For example, the load 40 may be any suitable device that may generate power via the rotational output of the gas turbine engine 14, such as an electrical generator, a propeller of an airplane, and so forth.

Compressor blades are included as components of the compressor 22. The compressor blades are coupled to the shaft 36 and will rotate as the shaft 36 is driven to rotate by the turbine 26, as described above. The rotation of the compressor blades within the compressor 22 compress air from an air intake 42 into pressurized air 44. The pressurized air 44 is then fed into the fuel nozzles 28 of the turbine combustor 24. The fuel nozzles 28 mix the pressurized air 44 and the fuel to produce a suitable mixture ratio for combustion (e.g., a combustion that causes the fuel to more completely burn) so as not to waste fuel or cause excess emissions.

Exiting the turbine 26, the exhaust gas stream 38 may continue to flow in the downstream direction 46 towards the bottoming cycle 16 (e.g., the aftertreatment system 18). As noted above, as a result of the combustion process, the exhaust gas stream 38 may include certain byproducts, such as nitrogen oxides ($NO_x$, including $NO$ and $NO_2$), sulfur oxides ($SO_x$), carbon oxides ($CO_x$), and unburned hydrocarbons. Due to certain regulatory requirements, the aftertreatment system 18 may be employed to reduce the concentration of such byproducts prior to releasing the exhaust gas stream 38 into the atmosphere. As illustrated, the aftertreatment system 18 may include the SCR system 20 to reduce or remove $NO_x$ emissions from the exhaust gas stream 38.

The SCR system 20 includes an SCR reactor 48 having a catalyst 50, an inlet 52, and an outlet 54. The SCR system 20 also includes an injector 56 located upstream from the inlet 52 of the SCR reactor 48 to inject a reductant (e.g., ammonia [$NH_3$]) into the SCR reactor 48 such that the reductant is adsorbed on the surface of the catalyst 50. The exhaust gas stream 38 containing $NO_x$ may flow into the SCR reactor 48 through the inlet 52 and react with the reductant adsorbed on the surface of the catalyst 50. Via this $NO_x$ reduction reaction, $NO_x$ may be converted into nitrogen ($N_2$) and water ($H_2O$), and accordingly, the $NO_x$ level in the exhaust gas stream 38 may be reduced.

The catalyst 50 may be any catalyst suitable for $NO_x$ reduction reactions via the SCR process. For example, the catalyst 50 may be manufactured from a carrier and an active catalytic component. The carrier may include various ceramic materials, such as titanium oxide. The active catalytic component may include oxides of base metals, vanadium and tungsten, for example. The active catalytic component may also include zeolites, such as iron- and copper-exchanged zeolites. The active catalytic component may further include various precious metals, such as gold, silver, and platinum.

The $NO_x$ reduction reaction takes place as the gases (e.g., the exhaust gas stream 38 and the reductant) pass through the SCR reactor 48. Before entering the SCR reactor 48, the reductant is injected by the injector 56 and mixed with the exhaust gas stream 38. The reductant may include anhydrous ammonia, aqueous ammonia, urea, or any combination thereof. Nevertheless, the unreacted reductant is released through the outlet 54 of the SCR reactor 48 as ammonia slip 58.

A desired reaction in the SCR reactor 48 has an optimal temperature range from approximately 225° C. to 445° C., preferably, from approximately 355° C. to 445° C. The ammonia slip 58 may occur when the temperature of the SCR reactor 48 is not in the optimal range for the reaction or when too much reductant is injected into the SCR reactor 48. Particularly, during the startup or shutdown of the gas turbine system 10, the temperature of the SCR reactor 48 may drop below 225° C., for example, at approximately 100° C. and thus, cause the ammonia slip 58 to be released from the outlet 54 of the SCR reactor 48.

It should be understood that the embodiments disclosed herein are not limited to the use of one SCR system 20, but may also include multiple SCR systems 20. It is also to be understood that reactions may occur at other temperatures. In addition, while in the illustrated embodiments the SCR system 20 is included in the aftertreatment system 18 to generally focus on the processing and removal of $NO_x$ from the exhaust gas stream 38, other embodiments may provide for the removal of other combustion byproducts in the exhaust gas stream 38, such as sulfur oxides ($SO_x$), carbon oxides ($CO_x$), and unburned hydrocarbons. In these embodiments, the SCR system 20 may include the catalyst 50 that may vary in geometry and/or chemical makeup depending on the composition that is being removed from the exhaust gas stream 38. Alternatively or additionally, the aftertreatment system 18 may include multiple SCR systems 20, each of which may focus on the processing and removal of one or more combustion byproducts in the exhaust gas stream 38.

After reducing the emissions level of the exhaust gas stream 38 (e.g., $NO_x$ in the exhaust gas stream 38) by the aftertreatment system 18, a treated exhaust gas stream 60 may exit from the aftertreatment system 18. The treated exhaust gas stream 60 may still include some combustion byproducts, such as $NO_x$, $SO_x$, $CO_x$, and unburned hydrocarbons. As noted above, in some cases, the treated exhaust gas stream 60 may include the ammonia slip 58. The treated exhaust gas stream 60 may then be delivered to other components of the bottoming cycle 16 for further processing and/or usage. For example, the bottoming cycle 16 may include a heat recovery steam generator (HRSG) and a steam turbine. The HRSG may use heat remaining in the treated exhaust gas stream 60 to drive the steam turbine to produce additional power, thereby increasing efficiency of the gas turbine system 10. The treated exhaust 60, after passing through the other components of the bottoming cycle 16, may exit the bottoming cycle 16 as a processed exhaust 61 (e.g., released into the atmosphere). It should be noted that the overall $NO_x$ emissions level of the gas turbine system 10 may be referred to as the amount of $NO_x$ in the treated exhaust stream 60 (as used below), or the amount of $NO_x$ in the processed exhaust 61 in the embodiments where the treated exhaust stream 60 undergoes further processing by the other components of the bottoming cycle 16.

As noted above, the gas turbine system 10 includes the emission controller 12 that may be used to control the operation of the gas turbine system 10 to reduce the overall emissions (e.g., $NO_x$, $SO_x$, $CO_x$, etc.) of the gas turbine system 10 (e.g., in the treated exhaust gas stream 60). Specifically, the emission controller 12 includes a gas turbine controller 62 and an aftertreatment controller 64, which may work together to coordinate processing and removal of emissions (e.g., $NO_x$) from the gas turbine system 10. For example, as described in detail below, the emission controller 12 may regulate one or more operating parameters of the gas turbine engine 14 and/or the SCR system 20 to control the relative amounts of $NO_x$ reduction in both the exhaust gas 38 and the treated exhaust gas 60. In other words, to reduce the overall $NO_x$ emission of the gas turbine system 10, $NO_x$ amount in the exhaust 38 exiting the gas turbine engine 14 may be allowed to be higher to enable increased reduction in $NO_x$ emissions in the SCR system 20.

As illustrated, the emission controller 12 includes a processor 66 and a memory 68. The processor 66 may be any general purpose or application-specific processor. The memory 68 may include one or more tangible, non-transitory, machine-readable media collectively storing instructions executable by the processor 66 to perform the methods and control actions described herein. For example, the memory 68 may include RAM, ROM, EPROM, EEPROM, CD-ROM, flash memory, or other optical disk storage, magnetic disk storage or other magnetic storage devices. The emission controller 12 may further include one or more analog-to-digital (A/D) converters for processing various analog inputs to the emission controller 12.

The emission controller 12 may monitor one or more inputs from one or more sensors located in the gas turbine system 10. The sensors may include, for example, pressure sensors, level sensors, temperature sensors, flow sensors, composition sensors, concentration sensors, status and position indicators (e.g. limit switches, Hall effect switches, acoustic proximity switches, linear variable differential transformers, position transducers), and the like. The sensors may be coupled to, disposed in or about, or fluidly in communication with various components of the gas turbine system 10 to obtain operating information thereof. For example, a turbine outlet sensor 70 may be operatively coupled at the outlet of the turbine 26 and obtain information including the temperature, gas flow rate, concentration of $NO_x$ (including NO and/or $NO_2$), and concentration of other combustion byproducts (including $SO_x$, $CO_x$, etc.). An SCR inlet sensor 72 may be operatively coupled at the inlet 52 of the SCR reactor 48 and obtain information including the temperature, gas flow rate, concentration of $NO_x$ (including NO and/or $NO_2$), concentration of other combustion byproducts (including $SO_x$, $CO_x$, etc.), and concentration of ammonia upstream from or immediately at the inlet 52 of the SCR reactor 48. A catalyst sensor 74 may be operatively coupled to the catalyst 50 in the SCR reactor 48 and obtain information including the temperature, gas flow rate, concentration of $NO_x$ (including NO and/or $NO_2$), concentration of other combustion byproducts (including $SO_x$, $CO_x$, etc.), and concentration of ammonia near or at the catalyst 50 in the SCR reactor 48. An SCR outlet sensor 76 may be operatively coupled at the outlet 54 of the SCR reactor 48 and obtain information including the temperature, gas flow rate, concentration of $NO_x$ (including NO and/or $NO_2$), concentration of other combustion byproducts (including $SO_x$, $CO_x$, etc.), and amount of the ammonia slip 58. A compressor outlet sensor 78 may be operatively coupled to the outlet of the compressor 22 and obtain information including the temperature, gas flow rate, and pressure of the air flowing into the combustor 24. One or more primary fuel sensors 80 and one or more secondary fuel sensors 82 may be operatively coupled to the primary fuel nozzles and the secondary fuel nozzles, respectively, and obtain information including the temperature, gas flow rate, and pressure of the fuel flowing into the combustor 24. The combination of fuel sensors 80 and 82 may provide information on the fuel split. The combination of the fuel sensors 80, 82 and the compressor outlet sensor 78 may provide information on the fuel to air ratio in the combustor 24. While the gas turbine system 10 include the sensors discussed above, it should be noted that the emission controller 12 may monitor inputs from one or more sensors located at various other locations of the gas turbine system 10, including, but not limited to, the air intake 42, the combustor 24, the load 40, and the bottoming cycle 16.

In addition, the emission controller 12 may be operatively coupled to various components of the gas turbine system 10 to control the operation of the gas turbine system 10. For example, the emission controller 12 may control the operation of one or more actuators coupled to and configured to move or control various components of the gas turbine system 10 (e.g., via switches, valves, motors, solenoids, positioners, or the like). By way of further example, the emission controller 12 may control the operation of the air intake 42 (e.g., via an actuator 84, such as an inlet guide vane actuator) and/or the compressor 22 (e.g., via an actuator 86) to regulate the air intake including the flow rate, temperature, pressure, and the like. The emission controller 12 may control the operation of the primary fuel nozzles (e.g., via one or more actuators 88) and the secondary fuel nozzles (e.g., via one or more actuators 90) to regulate the fuel flowing into the combustor 24, including the flow rate, temperature, pressure, the fuel split (e.g., amount of fuel delivered via each of the nozzles 30, 32) and the like. The emission controller 12 may control the operation of the injector 56 (e.g., via an actuator 92) to regulate the injection of the reductant into the SCR reactor 48, including the flow rate, temperature, pressure, and the like.

The emission controller 12 may control the operation of the various components of the gas turbine system 10 based on measured feedback (e.g., inputs from the sensors). For example, the emission controller 12 (e.g., the gas turbine controller 62) may control the compressor 22 and the fuel nozzles 30, 32 to deliver an air-fuel mixture with a specific fuel-to-air ratio based on the feedback of $NO_x$ emissions measured by the turbine outlet sensor 70. The emission controller 12 (e.g., the aftertreatment controller 64) may control the injector 92 to inject a reductant into the SCR reactor 48 with a specific flow rate based on the feedback of the ammonia slip 58 measured by the SCR outlet sensor 76. As discussed in greater detail below, the emission controller 12 may implement one or more control processes to regulate various components of the gas turbine system 10 (e.g., the fuel split from the fuel nozzles 30, 32 and the injector 56) to reduce the overall $NO_x$ emissions of the gas turbine system 10 based on the measured feedback from one or more sensors (e.g., the ammonia slip 58 by the SCR outlet sensor 76). In some embodiments, the emission controller 12 may control the operating temperature of the SCR reactor 48 based on the feedback from the SCR inlet sensor 72, for example, by directing a portion of heat from the exhaust 38 to other components of the bottoming cycle 16 (e.g., the HRSG).

Moreover, the emission controller 12 may be configured to receive a user input 94 and, based on the user input 94, to control operation of the gas turbine system 10 and $NO_x$ emissions. For example, the user input 94 may include an exhaust gas $NO_x$ setpoint, a desired power (e.g., megawatts), a desired fuel rate, reductant price, electricity price, electricity demand, fuel price, combustor outage intervals, $NO_x$ credits, other financial information, and/or other information related to operation of the turbine system 10. The user input 94 information may further be incorporated into control of $NO_x$ reduction in the exhaust gas 38 (e.g., $NO_x$ control within the gas turbine engine 14) and/or the treated exhaust gas 60 (e.g., $NO_x$ control within the SCR system 20). In certain embodiments, further constraints or control parameters may be used by the emission controller 12. For example, additional constraints may include allowable reductant slip based on environmental regulations or other operational constraints.

As noted above, in the SCR system 20, a reductant, such as ammonia ($NH_3$), injected from the injector 56 into the exhaust gas stream 38 may react, in the presence of the catalyst 50, with $NO_x$ to produce nitrogen ($N_2$) and water ($H_2O$), thereby reducing the amount of $NO_x$ in exhaust gas stream 38. The effectiveness of the SCR system 20 (e.g., $DeNO_x$ efficiency) may be represented by a ratio of the amount of $NO_x$ at the outlet 54 of the SCR reactor 48 to the amount of $NO_x$ at the inlet 54 of the SCR reactor 48. The $DeNO_x$ efficiency may be at least partially dependent upon a number of factors, including the reaction temperature in the reactor 48, composition of $NO_x$ (e.g., $NO/NO_2$ ratio, $NO/NO_x$ ratio, or $NO_2/NO_x$ ratio) at the inlet 52 of the SCR reactor 48, amount of the $NO_x$ in the exhaust gas 38, gas flow rate of the exhaust gas 38, temperature of the exhaust gas 38 at the inlet 52 of the SCR reactor 48, amount of reductant (e.g., ammonia) injected into the exhaust gas stream 38, composition of the exhaust gas 38 besides $NO_x$ (e.g., $SO_x$, $CO_x$), amount of other reactants and/or products of the SCR reduction reaction (e.g., water ($H_2O$), oxygen ($O_2$)), and characteristics of the catalyst 50 (e.g., type, amount, age, and the like). For example, FIG. 2 is an example plot 100 of the $DeNO_x$ efficiency of the SCR system 20 as a function of the temperature and the $NO/NO_x$ ratio of the exhaust gas 38 at the inlet 52 of the SCR reactor 48, when other factors remain substantially constant.

Figure 2:
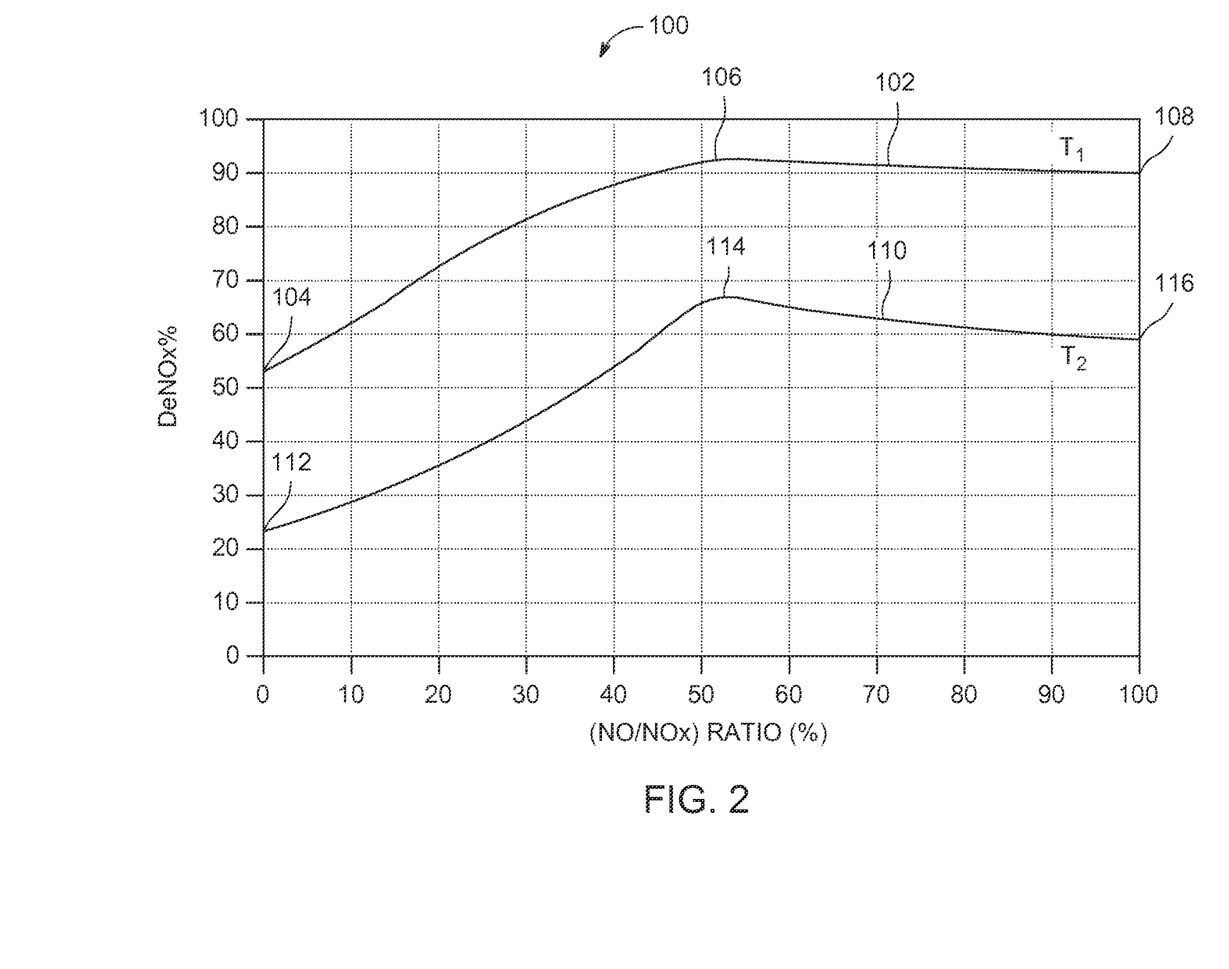
FIG. 2 is a plot of $DeNO_x$ efficiency of a selective catalytic reduction (SCR) system as a function of the temperature and $NO/NO_x$ ratio of an exhaust gas flowing into the SCR system.

As shown in FIG. 2, a first curve 102 represents the $DeNO_x$ efficiency of the SCR system 20 as a function of $NO/NO_x$ ratio at a higher temperature, $T_1$, of the exhaust gas stream 38 at the inlet 52 of the SCR reactor 48. The first curve 102 from a first point 104 to a second point 106 shows a generally upward trend, meaning the $DeNO_x$ efficiency of the SCR system 20 increases as the $NO/NO_x$ ratio increases (or the relative amount of NO to $NO_2$ increases). The first curve 102 from the second point 106 to a third point 108 shows a slightly downward trend but remains somewhat stable, meaning that the $DeNO_x$ efficiency of the SCR system 20 slightly decreases as the $NO/NO_x$ ratio increases. As such, the SCR system 20 has a maximum $DeNO_x$ efficiency about the point 106 of the example plot 100, but the $DeNO_x$ efficiency is generally insensitive to the increase of the $NO/NO_x$ ratio once past the point 106.

FIG. 2 also illustrates a second curve 110 representing the $DeNO_x$ efficiency of the SCR system 20 as a function of $NO/NO_x$ ratio at a lower temperature, $T_2$, (e.g., $T_2 < T_1$) of the exhaust gas stream 38 at the inlet 52 of the SCR reactor 48. The second curve 110 from a first point 112 to a second point 114 shows a generally upward trend, meaning the $DeNO_x$ efficiency of the SCR system 20 increases as the $NO/NO_x$ ratio increases (or the relative amount of NO to $NO_2$ increases). The second curve 110 from the second point 114 to a third point 116 shows a downward trend (but more prominent than the first curve 102 from the point 106 to the point 108), meaning that the $DeNO_x$ efficiency of the SCR system 20 decreases as the $NO/NO_x$ ratio increases. The SCR system 20 has a maximum $DeNO_x$ efficiency about the point 114. In addition, as shown in FIG. 2, the first curve 102 is generally above the second curve 110, meaning that the SCR system 20, with substantially the same $NO/NO_x$ ratio at the inlet 52 of the SCR reactor 48, generally has a greater $DeNO_x$ efficiency for the exhaust gas 38 with a higher temperature.

Accordingly, as illustrated by FIG. 2, the $DeNO_x$ efficiency of the SCR system 20 depends at least partly on the $NO/NO_x$ ratio (or $NO_2/NO_x$ ratio, or $NO/NO_2$ ratio) of the exhaust gas 38 at the inlet 52 of the SCR reactor 48. The $NO/NO_x$ ratio of the exhaust gas 38, in turn, depends at least partly on the fuel split for the gas turbine engine 14. As such, the fuel split may be controlled to provide a desired $NO/NO_2$ ratio in the exhaust gas stream 38, which may result in an increased $DeNO_x$ efficiency for the SCR system 20. Therefore, the overall $DeNO_x$ efficiency for the gas turbine system 10 may be increased. In some embodiments, the $NO/NO_2$ ratio in the exhaust gas stream 38 may be changed without substantially affecting the performance of the bottoming cycle 16. For example, the firing temperature of the gas turbine engine 14 and the flow rate of the exhaust 38 exiting the gas turbine engine 14 are not substantially affected by the change of the $NO/NO_2$ ratio in the exhaust gas stream 38. As such, in accordance with the present disclosure, the overall $DeNO_x$ efficiency for the gas turbine system 10 may be increased without substantially affecting the performance of the bottoming cycle 16.

Figure 3:
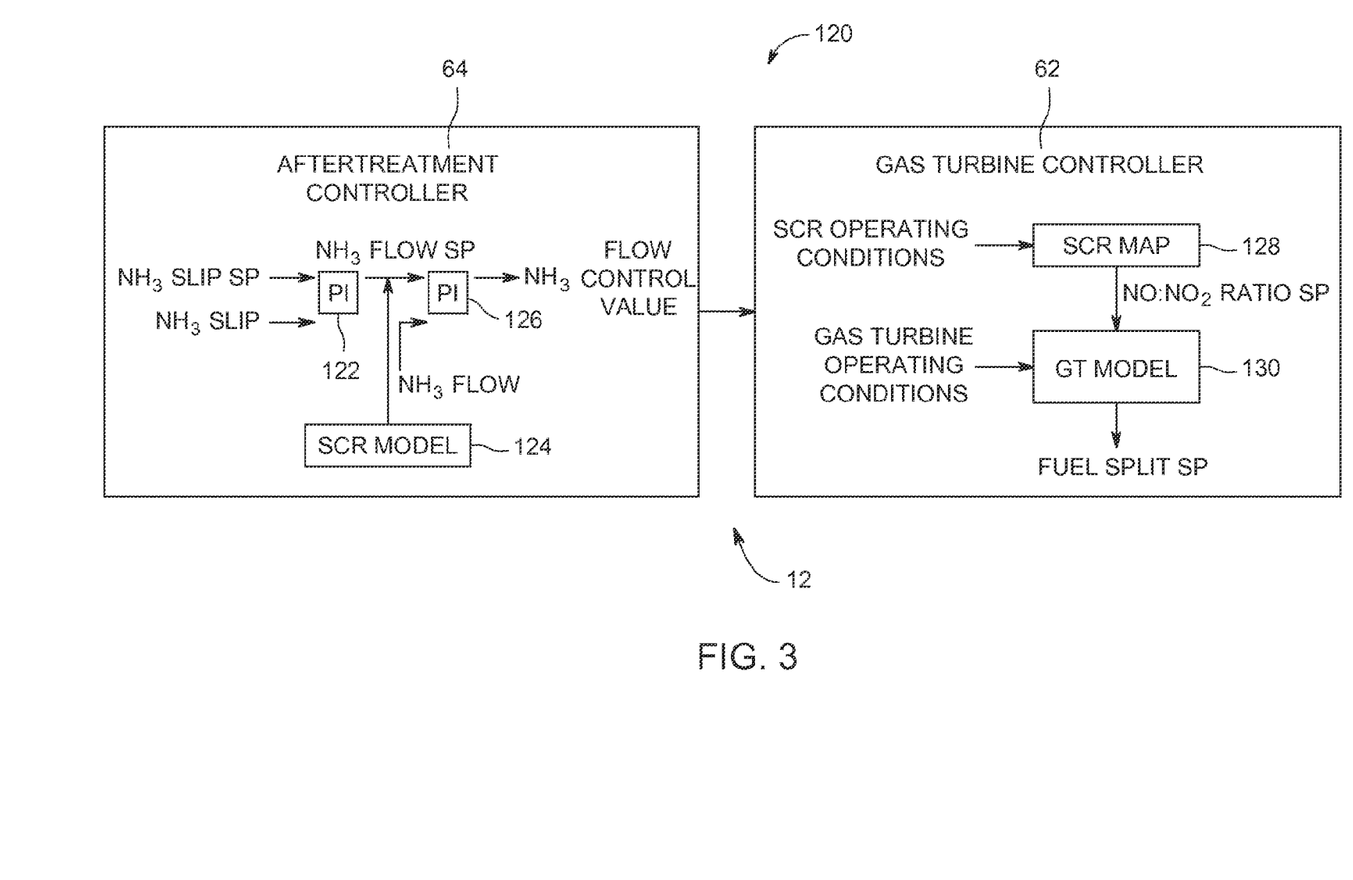
FIG. 3 is a block diagram of a control process that may be used by the emission controller for controlling emissions of the gas turbine system in accordance with an embodiment of the present disclosure.
Figure 4:
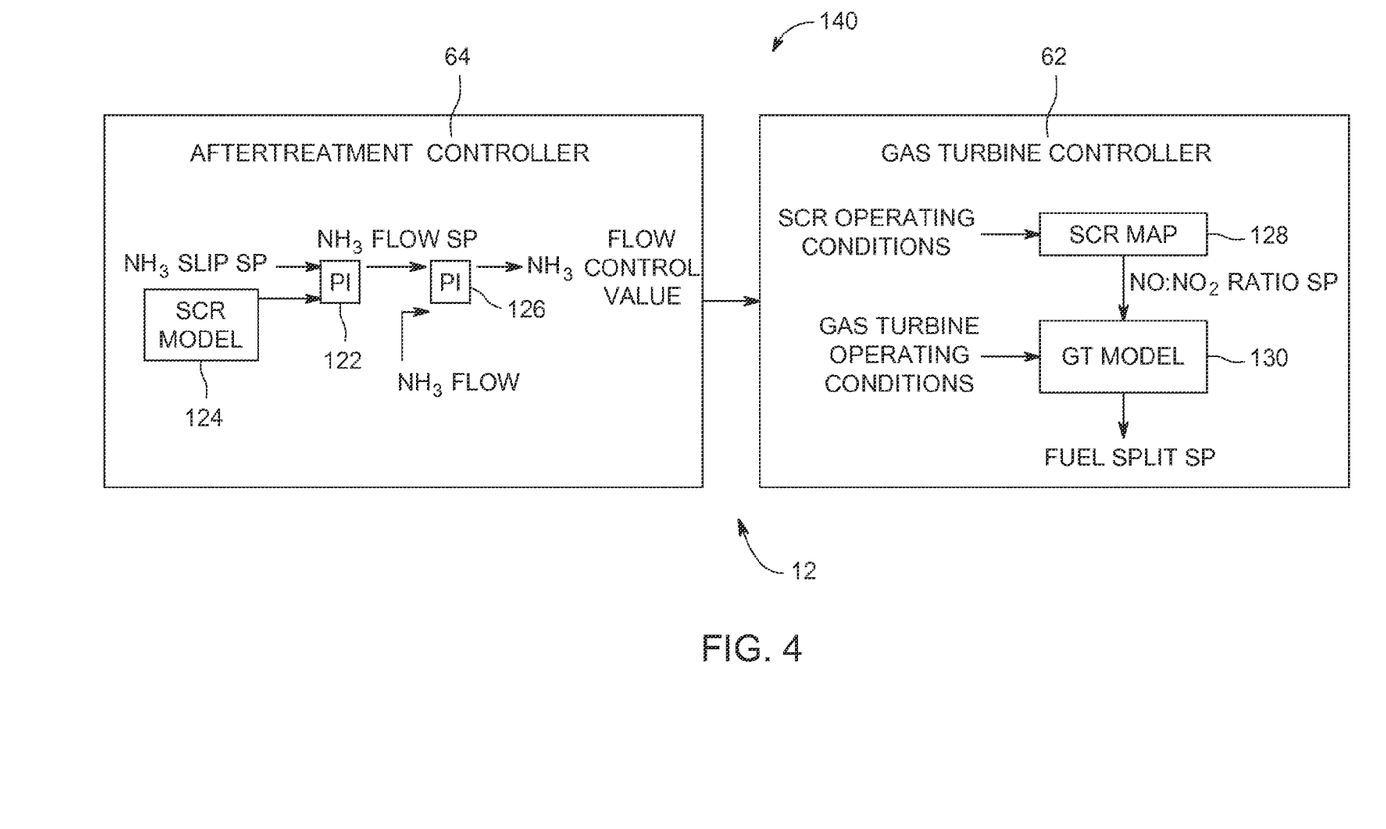
FIG. 4 is a block diagram of another control process that may be used by the emission controller for controlling emissions of the gas turbine system in accordance with an embodiment of the present disclosure.
Figure 5:
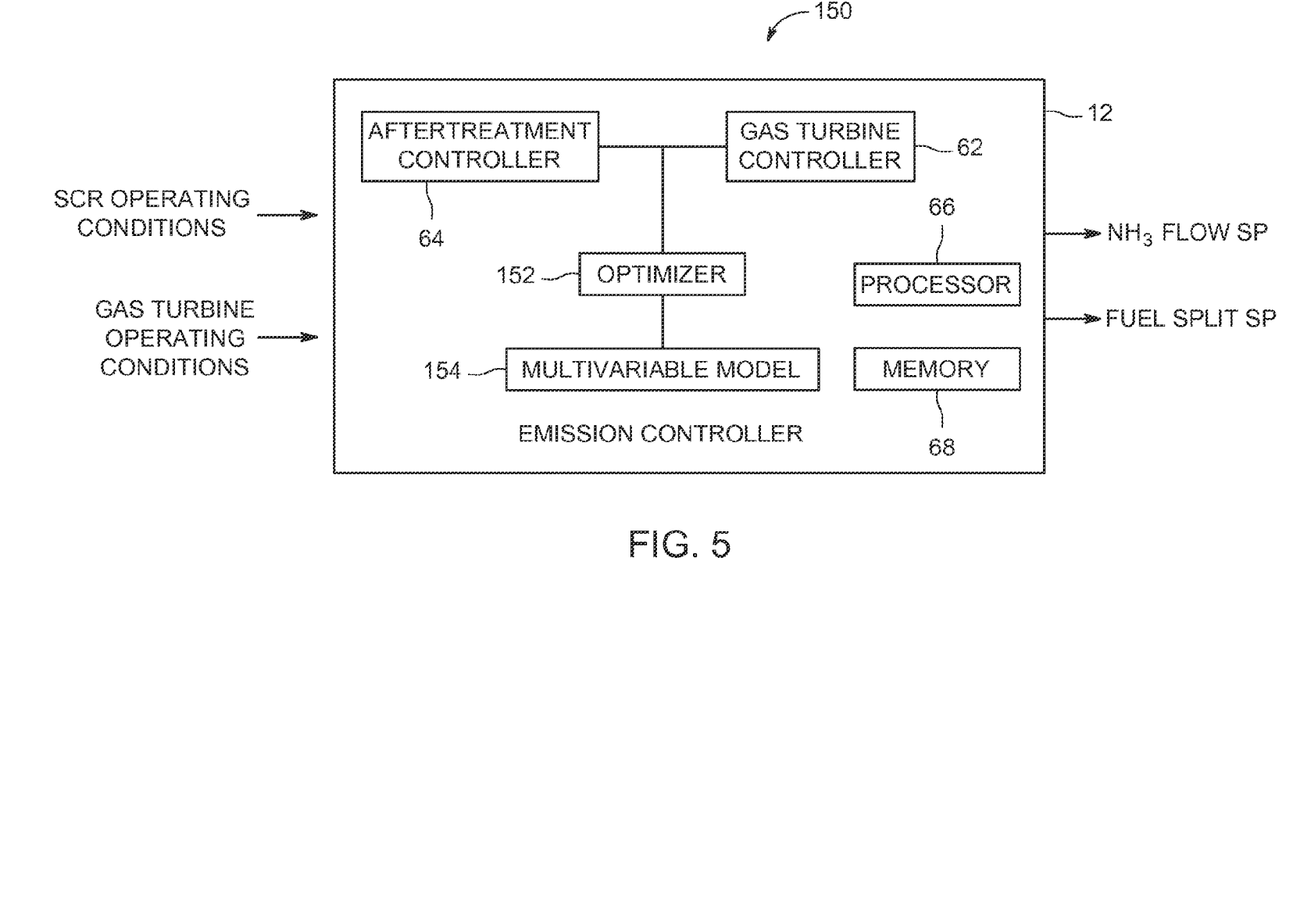
FIG. 5 is a block diagram of an additional control process that may be used by the emission controller for controlling emissions of the gas turbine system in accordance with an embodiment of the present disclosure.

In accordance with the present disclosure, the emission controller 12 may employ various control processes or schemes, to regulate and coordinate the gas turbine engine 14 and the SCR system 20 to reduce the overall NOx emission of the gas turbine system 10. FIGS. 3-5 illustrate different embodiments of certain control processes that may be used by the emission controller 12 for controlling emissions of the gas turbine system 10 in accordance with the present disclosure. FIG. 3 is a block diagram of an embodiment of a decentralized control process 120 used by the emission controller 12 for controlling emissions of the gas turbine system 10. "Decentralized" as used herein refers to somewhat separate gas turbine control via controller 62 and aftertreatment control via controller 64, the former of which focuses on controlling the operation of the gas turbine engine 14, and the latter of which focuses on controlling the operation of the SCR system 20. However, it should be noted that the gas turbine controller 62 and the aftertreatment controller 64 are components of the emission controller 12 and in communication with one another. Thus, in one embodiment, a single controller may be used to control both the gas turbine engine 14 and the SCR system 20. The control processes described below with respect to FIGS. 3-5 are directed to decrease the $NO_x$ emission levels in the treated exhaust 60 exiting the SCR system 20. However, it should be noted that in the embodiments where the treated exhaust 60 is further processed by other components of the bottoming cycle 16, the described processes with respect to FIGS. 3-5 may be similarly applied to decreasing the $NO_x$ emission levels in the processed exhaust 61 exiting the bottoming cycle 16.

The aftertreatment controller 64 is configured to generate as an output a control signal for regulating the operation of the injector 56, for example, a value of the flow rate of ammonia at the injector 56 of the SCR system 20. As illustrated in FIG. 3, the aftertreatment controller 64 takes inputs including an ammonia slip setpoint ($NH_3$ slip sp) and an amount of the ammonia slip 58 ($NH_3$ slip) measured by, for example, the SCR outlet sensor 76. The $NH_3$ slip sp is the target or desired value for the ammonia slip 58 exiting the SCR reactor 48 and may be set by a user, for example, via the user input 94 of the emission controller 12, or be generated directly by the emission controller 12, for example, from the historical values stored in the memory 68. A first proportional-integral (PI) controller 122 takes the $NH_3$ slip sp and the $NH_3$ slip as inputs to generate an ammonia flow setpoint ($NH_3$ flow sp). The $NH_3$ flow sp is the target or desired value for ammonia injected by the injector 56 to the exhaust gas stream 38. The first PI controller 122 may generate the $NH_3$ flow sp based on a SCR model 124 for the SCR system 20.

The SCR model 124 for the SCR system 20 is a chemical model for describing the chemical reactions that take places in the SCR reactor 48. As noted above, in the SCR system 20, ammonia is injected from the injector 56 into the exhaust gas stream 38 and may react, in the presence of the catalyst 50, with NOx to produce nitrogen ($N_2$) and water ($H_2O$). This SCR process may involve a series of reactions, including ammonia adsorption and desorption reaction with the catalyst 50, ammonia oxidation reaction, standard SCR reaction, fast SCR reaction, $NO_2$ SCR reaction, and NO oxidation reaction. The SCR model 124 is a global reaction scheme (e.g., via rate equations) for describing characteristics (e.g., concentration change of each chemical reactant or product) of the individual reactions. Parameters involved in the SCR model 124 may include chemical composition and concentration of each chemical reactant or product and the coverage ratio of ammonia on the catalyst 50. The coverage ratio of ammonia on the catalyst 50 may further depend at least on the characteristics of the catalyst 50, such as chemical composition, catalyst substrate, physical geometry, and the time of usage.

A second PI controller 126 of the aftertreatment controller 64 takes the $NH_3$ flow sp, as the output of the first PI controller 122, and an ammonia flow rate ($NH_3$ flow) as the inputs and generates an ammonia flow control value. The $NH_3$ flow is a measured value of the flow rate of ammonia at the injector 56, for example, obtained by the SCR inlet sensor 72. The $NH_3$ flow control value, as the output of the aftertreatment controller 64, may be communicated to the injector 56 to regulate the operation of the injector 56. For example, the actuator 92 coupled to the injector 56 may be adjusted to open or close the injector 56 to inject ammonia with a certain flow rate (e.g., the $NH_3$ flow control value).

SCR operating conditions, including the $NH_3$ flow control value, may then be used by the gas turbine controller 62 as inputs. SCR operating conditions may include any operating parameters of various components of the SCR system 20, including, but not limited to, the $NH_3$ flow control value, reaction temperature in the reactor 48, composition of NOx (e.g., $NO/NO_2$ ratio, $NO/NO_x$ ratio, or $NO_2/NO_x$ ratio) at the inlet 52 of the SCR reactor 48, amount of the $NO_x$ in the exhaust gas 38, temperature of the exhaust gas 38 at the inlet 52 of the SCR reactor 48, composition and amount of other components of the exhaust gas 38 besides $NO_x$ (e.g., $SO_x$, $CO_x$), amount of other reactants and/or products of the SCR reduction reaction (e.g., water ($H_2O$), oxygen ($O_2$)), and characteristics of the catalyst 50 (e.g., type, amount, age, and the like). As noted above, the SCR operating conditions may be obtained by one or more sensors coupled to the various components of the SCR system 20.

The gas turbine controller 62 includes a SCR map 128 that takes the SCR operating conditions as inputs to generate a $NO/NO_2$ ratio setpoint ($NO/NO_2$ ratio sp). The SCR map 128 is an operating map of the SCR system 20 and may be based on manufacturing test results, similar SCR systems, or predictions by a computer program. The SCR map 128 may be a plot, figure, or table that plots or lists the $DeNO_x$ efficiencies of the SCR system 20 at various SCR operating conditions. For example, the SCR map 128 may include one or more $DeNO_x$ efficiency curves with respect to parameters as described above, such as the $NH_3$ flow control value, composition of $NO_x$ (e.g., $NO/NO_2$ ratio, $NO/NO_x$ ratio, or $NO_2/NO_x$ ratio) at the inlet 52 of the SCR reactor 48, temperature of the exhaust gas 38 at the inlet 52 of the SCR reactor 48, and characteristics of the catalyst 50 (e.g., type, amount, age, and the like). As such, the $NO/NO_2$ ratio setpoint may be obtained from the SCR map 128 when other SCR operating conditions and the $DeNO_x$ efficiency of the SCR system 20 are known. As noted above, these other SCR conditions may be obtained by the one or more sensors (e.g., the SCR inlet sensor 72, the catalyst sensor 74, and the SCR outlet sensor 76) coupled to various locations of the SCR system 20, and the $DeNO_x$ efficiency may be obtained by measuring $NO_x$ level at the outlet 54 and the inlet 52 of the SCR reactor 48 (e.g., via the SCR outlet sensor 76 and the inlet sensor 72, respectively) and taking the ratio of the measured $NO_x$ level at the outlet 54 to the measured $NO_x$ level at the inlet 52. Therefore, the SCR map 128 may provide as the output the $NO/NO_2$ ratio (or the $NO/NO_x$, $NO_2/NO_x$ ratio) setpoint, which may correspond to a desired overall $DeNO_x$ efficiency of the gas turbine system 10.

The obtained $NO/NO_2$ ratio setpoint, along with gas turbine operating conditions, are then provided as inputs to a gas turbine (GT) model 130 to generate a fuel split setpoint (fuel split sp) as an output. The gas turbine operating conditions may include any operating parameters for the gas turbine engine 12, including, but not limited to, the temperature and flow rate of the exhaust gas stream 38, fuel-to-air ratio of the fuel-air mixture flowing to the combustor 24, and measured fuel split. The GT model 130 may be any suitable model for describing the operations of the gas turbine engine 14, including the combustor 24. For example, the GT model 130 may be a physics-based (e.g., a one dimensional aero-thermal mathematical model that capture heat transfer and compressible flow phenomena of the gas turbine engine 14), a data-driven (e.g., empirical) model, or any combination therefore. The GT model 130 may be a steady-state model or a dynamic model. The GT model 130 describes the operations of the gas turbine engine 14 with a series of sets of gas turbine operating conditions. As such, the fuel split setpoint may be obtained from the GT model 130 when one or more operating conditions are known. For example, as noted above, the parameters of the air and fuel flowing into the combustor 24 may be obtained by the compressor outlet sensor 78 and the fuel sensors 80, 82. The temperature and flow rate of the exhaust gas stream 38 may be obtained by the turbine outlet sensor 70. Therefore, the GT model 130 may provide as the output the fuel split setpoint, which may correspond to the desired overall $DeNO_x$ efficiency of the gas turbine system 10. Accordingly, the emission controller 12 may regulate relevant components (e.g., the primary fuel nozzles 30 and the secondary fuel nozzles 32) to deliver the fuel based on the obtained fuel split setpoint, which targets to reduce the overall $NO_x$ emissions of the gas turbine system 10. It is also to be noted that while controllers 122, 126 are depicted as PI controllers, other embodiments may use PID controllers, programmable logic controllers (PLCs), custom controllers, and so on.

FIG. 4 is a block diagram of another embodiment of a decentralized control process 140 that may be used by the emission controller 12 for controlling emissions of the gas turbine system 10. As the control process 140 illustrated in FIG. 4 includes similar or same elements to the control process 120 illustrated in FIG. 3, the same reference numerals are used for the same elements in FIGS. 3 and 4, and FIG. 4 will be described similarly to FIG. 3.

The aftertreatment controller 64 illustrated in FIG. 4 is likewise configured to generate as an output a control signal for regulating the operation of the injector 56, for example, a value of the flow rate of ammonia at the injector 56 of the SCR system 20. However, the first PI controller 122 of the aftertreatment controller 64 illustrated in FIG. 4 takes inputs including the ammonia slip setpoint (NH$_3$ slip sp) and the SCR model 124. As discussed above, the SCR model 124 describes the chemical reactions that take places in the SCR reactor 48 using the parameters such as concentration of each chemical reactant or product (e.g., ammonia injected to the SCR reactor 48 and the amount of the ammonia slip 58) and the characteristics of the catalyst 50. Accordingly, the first PI controller may generate the NH$_3$ flow sp directly from the NH$_3$ slip sp and the SCR model 124.

Once the NH$_3$ flow sp is generated, the rest of the control process 140 is the same as the control process 120. For example, the second PI controller 126 takes the NH$_3$ flow sp and the measured ammonia flow rate (NH$_3$ flow) as the inputs and generates the NH$_3$ flow control value. The NH$_3$ flow control value, along with other SCR operating conditions may then be used by the gas turbine controller 62 as inputs to generate the NO/NO$_2$ ratio sp using the SCR map 128. The GT model 130 may then use the generated NO/NO$_2$ ratio sp and the gas turbine operating conditions as inputs to generate the fuel split setpoint, which may correspond to the desired overall DeNO$_x$ efficiency of the gas turbine system 10. Accordingly, the emission controller 12 may regulate relevant components (e.g., the primary fuel nozzles 30 and the secondary fuel nozzles 32) to deliver the fuel based on the obtained fuel split setpoint, which targets to reduce the overall NO$_x$ emissions of the gas turbine system 10.

FIG. 5 is a block diagram of an embodiment of a multivariable control process 150 used by the emission controller 12 for controlling emissions of the gas turbine system 10. Different from the decentralized control processes 120, 140 illustrated in FIGS. 3 and 4, where the NH$_3$ flow sp is generated first using the aftertreatment controller 64, and the fuel split is generated second using the gas turbine controller 62, in the multivariable control scheme 150 illustrated in FIG. 5, the NH$_3$ flow sp and the fuel split sp are generated by the emission controller 12 at substantially the same time.

The emission controller 12 takes the SCR operating conditions and the gas turbine operating conditions as inputs to generate the NH$_3$ flow sp and the fuel split sp using an optimizer 152. The optimizer 152 may be configured to control or regulate one or more operating parameters of the gas turbine system 10 to coordinate (e.g., optimize relative amounts of) NO$_x$ reduction in the gas turbine engine 14 and the SCR system 20. For example, the optimizer 152 may use a multivariable model 154 that is stored in the memory 68 for controlling NO$_x$ reduction in the exhaust gas 38 and treated exhaust gas 60. The optimizer 152 may control or regulate the various components of the gas turbine system 10 based on the measured feedback from the one or more sensors, such as the SCR outlet sensor 76, and the turbine outlet sensor 70. In certain embodiments, further constraints or control parameters may be used by the optimizer 58. For example, additional constraints may include allowable reductant slip based on environmental regulations, such as NH$_3$ slip sp. In the illustrated embodiment, the optimizer 152 may regulate or control the gas turbine system 10 via the gas turbine controller 62 and the aftertreatment controller 64. In some embodiments, the optimizer 152 may regulate or control the gas turbine system 10 directly (e.g., without the gas turbine controller 62 and the aftertreatment controller 64).

As noted above, the optimizer 152 is configured to regulate operation of the gas turbine system 10 to control the overall NO$_x$ reduction within the gas turbine system 10. For example, in one embodiment, variations in NO$_x$ levels in the exhaust gas 38 may be scheduled (e.g., preset), and the SCR system 20 may be controlled to achieve permitted NO$_x$ levels in the treated exhaust gas 60. In another embodiment, reductant slip (e.g., the ammonia slip 58) and NO$_x$ levels in the treated exhaust gas 60 may be simultaneously controlled to achieve a permitted level of NO$_x$ in the treated exhaust gas 60. In such an embodiment, one or more operating conditions of the gas turbine engine 14, such as the fuel split into the combustor 24, may be regulated to provide a desired NO/NO$_2$ ratio in the exhaust gas 38, which may in turn provide a desired DeNO$_x$ efficiency of the SCR system 20. In this manner, the overall NOx emission (e.g., the NO$_x$ level in the treated exhaust gas 60) may be reduced while the NO$_x$ level in the exhaust gas 38 exiting the gas turbine engine 14 may be increased or decreased (which is not as important as the NO/NO$_2$ ratio).

As noted above, the optimizer 152 targets the overall DeNO$_x$ efficiency of the gas turbine system 10 by regulating and coordinating the operations of the SCR system 20 and the gas turbine engine 14 based on the measured feedback from the sensors disposed along the gas turbine system 10. The optimizer 152 (or the emission controller 12) may generate outputs such as the NH$_3$ flow sp and the fuel split sp. Based on the generated NH$_3$ flow sp and the fuel split sp, the emission controller 12 may regulate or control various components of the gas turbine system 10, for example, the injector 56 (e.g., to control the flow rate of ammonia injected into the exhaust gas stream 38) and the fuel nozzles 20, 32 (e.g., to control the fuel split into the combustor 24). The multivariable model 154 used by the optimizer 152 may be any suitable model that incorporates the operating parameters of the gas turbine engine 14 and the SCR system 20 and utilizes the NO/NO$_2$ ratio (or the NO/NO$_x$ ratio, the NO$_2$/NO$_x$ ratio) in the exhaust gas 38 to determine the DeNO$_x$ efficiency of the downstream SCR system 20. For example, the multivariable model 154 may include the SCR model 124 for describing the chemical reactions in the SCR system 20, and the GT model 130 for describing operations of the gas turbine engine 14. The multivariable model 154 may be a simple predictive model, a linear quadratic model, or a Hinfinity model, or any combination thereof.

As noted above, the control processes described above with respect to FIGS. 3-5 are directed to decrease the NO$_x$ emission levels in the treated exhaust 60 exiting the SCR system 20 and may be similarly applied to decreasing the NO$_x$ emission levels in the processed exhaust 61 exiting the bottoming cycle 16. For example, with respect to FIGS. 3 and 4, the controller 12 may include a bottoming cycle model for describing chemical and physical reactions that take places in the bottoming cycle 16, including the SCR system 20 and other various components. The bottoming cycle model may include the SCR model 124, a pre-SCR model for describing reactions and/or processes occurred for the exhaust stream 38 before entering the SCR system 20 (e.g., directing a portion of the heat from the exhaust stream 38 to other components of the bottoming cycle 16), and a post-SCR model for describing reactions and/or processes occurred for the treated exhaust stream 60 before exiting the bottoming cycle 16 (e.g., utilizing a portion of the heat from the treated exhaust stream 60 by a HRSG). Likewise, with respect to FIGS. 3 and 4, the controller 12 may include a bottoming cycle map that is a plot, figure, or table for plotting or listing the $DeNO_x$ efficiencies of the bottoming cycle 16 (e.g., including the SCR system 20 and the other components of the bottoming cycle 16) at various operating conditions. Similarly, with respect to FIG. 5, the multivariable model 154 may be any suitable model that incorporates the operating parameters of the gas turbine engine 14 and the bottoming cycle 16 and utilizes the $NO/NO_2$ ratio (or the $NO/NO_x$ ratio, the $NO_2/NO_x$ ratio) in the exhaust gas 38 to determine the $DeNO_x$ efficiency of the downstream bottoming cycle 16. For example, the multivariable model 154 may include the SCR model 124, the pre-SCR model, the post-SCR model, and the GT model 130. Accordingly, the controller 12 may take the measured feedback of the gas turbine system 10, such as a NH3 slip measured at the exit of the bottoming cycle 16 (e.g., in the processed exhaust stream 61) and the operating conditions of the bottoming cycle 16, as inputs to control the overall $NO_x$ emission of the gas turbine system 10. Further, the optimizer 152 may target the overall $DeNO_x$ efficiency of the gas turbine system 10 by regulating and coordinating the operations of the bottoming cycle 16 (e.g., including the SCR system 20 and other components) and the gas turbine engine 14 based on the measured feedback from the sensors disposed along the gas turbine system 10.

Figure 6:
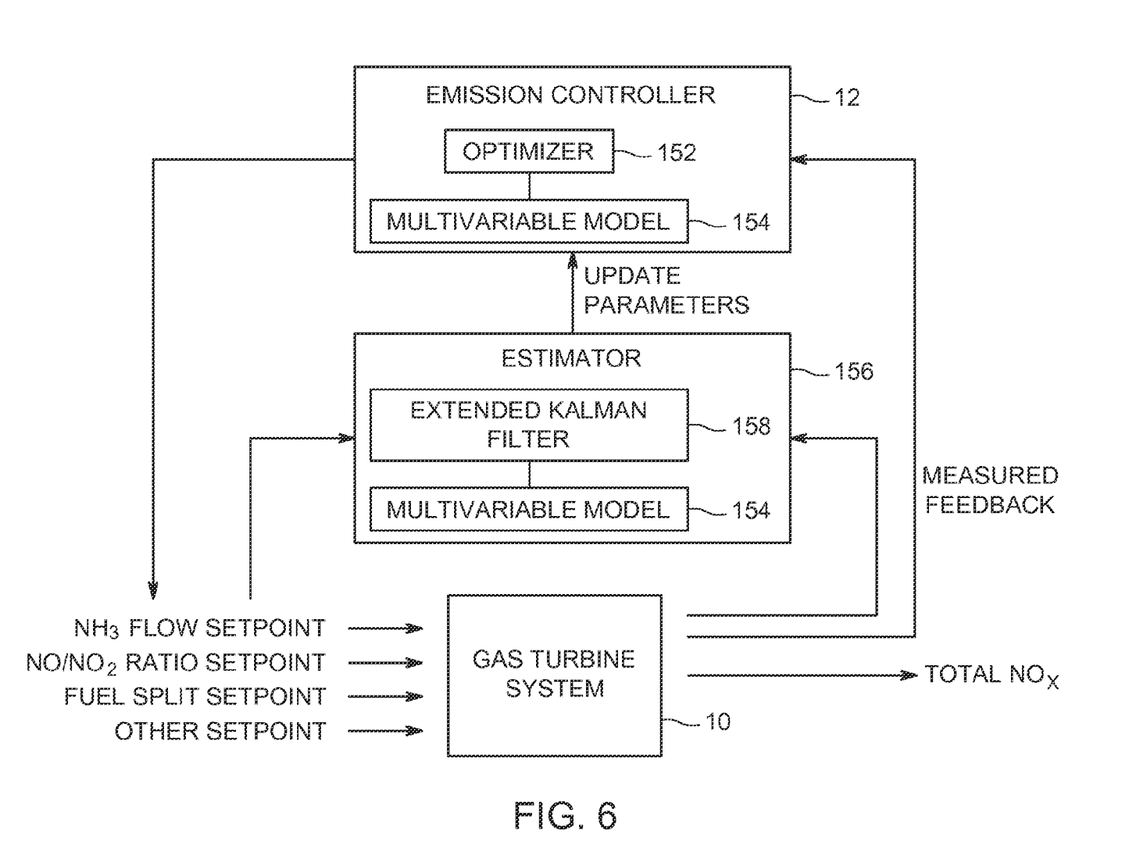
FIG. 6 is a block diagram of a more detailed illustration of the control process of FIG. 5.

FIG. 6 is a more detailed illustration of the emission control process 150 of FIG. 5 for controlling the overall $NO_x$ emissions of the gas turbine system 10. As discussed above, the emission controller 12 may be configured to control or regulate the operations of the gas turbine system 10 based on measured feedback of the sensors disposed along the gas turbine system 10 to reduce the overall $NO_x$ emission. For example, as illustrated, the measured feedback may include the amount of $NO_x$ and the ammonia slip 58 in the treated exhaust 60 (or in the processed exhaust 61). The emission controller 12 may include the optimizer 152, which is based on the multivariable model 154, to regulate and coordinate the $NO_x$ emission of the gas turbine engine 14 and the SCR system 20 to reduce the overall $NO_x$ emission of the gas turbine system 10. For example, the emission controller 12 may generate setpoints for various components of the gas turbine system 10, such as the $NH_3$ flow sp, the $NO/NO_2$ ratio sp, the fuel split sp, and other setpoints such as a setpoint of the temperature of the exhaust gas 38 exiting the gas turbine engine 14.

As noted above, the optimizer 152 of the emission controller 12 may be based on the multivariable model 154, which may include various parameters related to the operations of the gas turbine engine 14 and the SCR system 20. Many of these parameters may change over the time. For example, the multivariable model 154 may include the SCR model 124 to describe the chemical reactions in the SCR system 20. One of the parameters used by the SCR model 124 is the coverage ratio of reductant (e.g., ammonia) on the catalyst 50, which may further depend at least on the characteristics of the catalyst 50, such as chemical composition, catalyst substrate, physical geometry, and the time of usage. The characteristics of the catalyst 50 may be different with respect to different embodiments of the SCR system 20, or with respect to time (e.g., catalyst degrading over time), or a combination thereof. As such, the coverage ratio of reductant on the catalyst 50 used in the SCR model 124 may be tuned or calibrated for different embodiments of the SCR system 20 and/or over time. Therefore, the emission controller 12 may include an estimator 156 configured to estimate parameters used in the SCR model 124, such as the coverage ratio of reductant on the catalyst 50, adapting to the changing (e.g., with respect to embodiments of the SCR system 20 and/or time) characteristics of the parameters in the SCR model 124. It should be noted that the coverage ratio of reductant on the catalyst 50 in the SCR model 124 is used here as an example for illustrating the operations of the estimator 156, and the estimator 156 may be applied to estimate any suitable parameters used in the multivariable model 154 and the SCR model 124.

The estimator 156 may utilize any suitable parameter identification techniques such as Kalman filtering, tracking filtering, regression mapping, neural mapping, inverse modeling techniques, or a combination thereof. The filtering may be performed by a modified Kalman filter, an extended Kalman filter, or other filtering algorithm, or alternatively, the filtering may be performed by proportional and integral regulators or other forms of square (n-inputs, n-outputs) or non-square (n-input, m-outputs) regulators. As illustrated in FIG. 6, the estimator 156 includes an extended Kalman filter 158 configured to estimate parameters in the multivariable model 154. The extended Kalman filter 158 may model a parameter (e.g., coverage ratio of reductant on the catalyst 50, reaction rate factor of each reactant in the SCR reactor 48, etc.) in the multivariable model 154 as a constant and then estimate the parameter by comparing the model prediction and the measured feedback (e.g., via one or more sensors coupled to various components of the gas turbine system 10) in a stochastic manner. For example, the estimator 156, including the extended Kalman filter 158, may be implemented online (e.g., integrated with the gas turbine system 10 and functioning when the gas turbine system 10 in operation), and the extended Kalman filter 158 may calibrate or update the reaction activity (e.g., the reductant coverage ratio) of the catalyst 50 by adapting the overall reactions rates for $NH_3$, NO, and $NO_2$ through multipliers on these rates. The multipliers may represent the activities of the catalyst 50 with respect to $NH_3$, NO, and $NO_2$. It should be noted that, although the estimator 156 is described herein with respect to the control scheme 150, the estimator 156 may likewise be applied to a variety of control processes in accordance with the present disclosure, including the control processes 120, 140 as illustrated in FIGS. 3 and 4, respectively. Accordingly, feedback from system 10 operations may be used to update one or more models (e.g., model 154), thus improving control accuracy.

Figure 7:
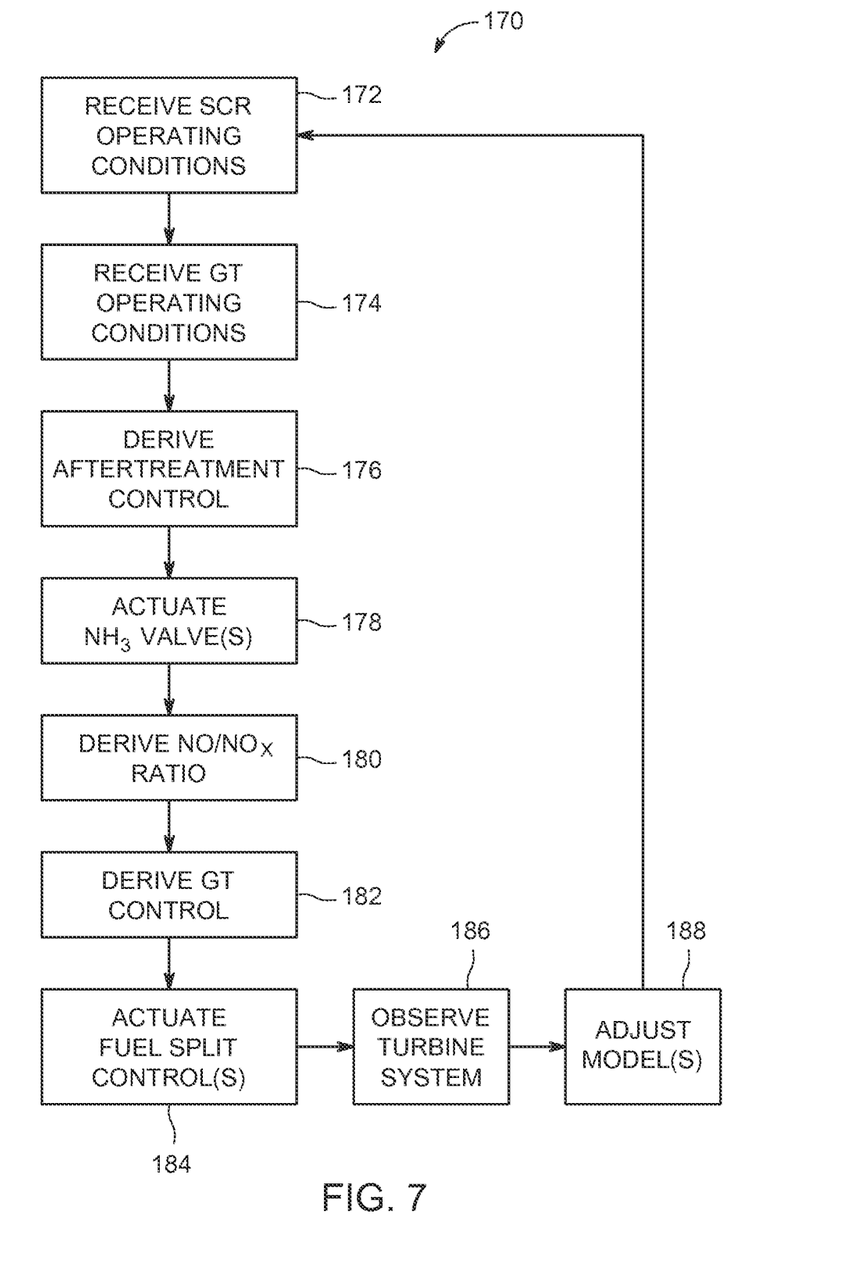
FIG. 7 is a flow diagram of a process for controlling emissions of the gas turbine system in accordance with the present disclosure.

FIG. 7 illustrates a process 170 for controlling the overall $NO_x$ emissions of the gas turbine system 10 by the emission controller 12 in accordance with the present disclosure. The method 170 begins with receiving the SCR operating conditions (block 172). In some embodiments, the bottoming cycle operating conditions, including the operating conditions of the SCR system 20 and other components of the bottoming cycle 16. The method 170 also includes receiving the gas turbine operating conditions (block 174) by the emission controller 12 (e.g., the processor 66). As discussed above, the SCR operating conditions may include any operating parameters of various components of the SCR system 20, including, but not limited to, the $NH_3$ flow control value, reaction temperature in the reactor 48, composition of $NO_x$ (e.g., $NO/NO_2$ ratio, $NO/NO_x$ ratio, or $NO_2/NO_x$ ratio) at the inlet 52 of the SCR reactor 48, amount of the $NO_x$ in the exhaust gas 38, temperature of the exhaust gas 38 at the inlet 52 of the SCR reactor 48, composition and amount of other components of the exhaust gas 38 besides $NO_x$ (e.g., $SO_x$, $CO_x$), amount of other reactants and/or products of the SCR reduction reaction (e.g., water ($H_2O$), oxygen ($O_2$)), and characteristics of the catalyst 50 (e.g., type, amount, age, and the like). The gas turbine operating conditions may include any operating parameters for the gas turbine engine 12, including, but not limited to, the temperature and flow rate of the exhaust gas stream 38, firing temperature, fuel-to-air ratio of the fuel-air mixture flowing to the combustor 24, and fuel split. The SCR operating conditions and the gas turbine operating conditions may be obtained by one or more sensors (e.g., the SCR inlet sensor 72, the catalyst sensor 74, the SCR outlet sensor 76, the compressor outlet sensor 78, and the fuel nozzle sensors 80, 82) coupled to the various components of the gas turbine system 10. Although FIG. 7 illustrates receiving the SCR operating conditions prior to receiving the gas turbine operating conditions, it should be noted that in some embodiments the emission controller 12 is configured to receive the gas turbine operating conditions before, or substantially simultaneous with, to receive the SCR operating conditions.

Based on the received SCR operating conditions and the gas turbine conditions, the emission controller 12 may then derive one or more aftertreatment control signals (block 176), for example, control signals of the SCR system 20 such as the $NH_3$ flow control value. As discussed above, the one or more aftertreatment control signals may be derived by the emission controller 12 (or the aftertreatment controller 64) based on the SCR model 124 or the multivariable model 154. Based on the derived aftertreatment control signals, the emission controller 12 may control or regulate the corresponding components. For example, the emission controller 12 may regulate or control the injector 56 (e.g., via the actuator 92) to inject ammonia to the exhaust gas 38 with a fixed flow rate (e.g., the derived $NH_3$ flow control value) (block 178).

The emission controller 12 may further derive the $NO/NO_x$ ratio (or the $NO/NO_2$ ratio, or the $NO_2/NO_x$ ratio) setpoint in the exhaust gas 38, for example, based on the SCR map 128 or the multivariable model 154 (block 180). As discussed above, the derived $NO/NO_x$ ratio targets reducing the overall $NO_x$ emissions of the gas turbine system 10. Based on the derived $NO/NO_x$ ratio in the exhaust gas 38, the emission controller may further derive one or more gas turbine control signals (block 182). For example, based on the GT model 130 or the multivariable model 154, the emission controller 12 may derive the fuel split that corresponds to the derived $NO/NO_x$ ratio in the exhaust gas 38. Accordingly, the emission controller 12 may control or regulate one or more components of the gas turbine engine 14 based on the derived gas turbine controls. For example, the emission controller 12 may regulate or control the fuel nozzles 30, 32 (e.g., via the fuel nozzle actuators 88, 90) to deliver fuel to the combustor 24 with a certain fuel split (e.g., the derived fuel split sp) (block 184).

After the controller 12 regulates or controls the gas turbine engine 14 based on the derived fuel split sp, the controller 12 may monitor or observe the operations of the gas turbine system 10 (block 186). For example, the controller 12 may via one or more sensors (e.g., the SCR outlet sensor 76) measure the overall $NO_x$ emissions of the gas turbine system 10. Based on the measured feedback (e.g., the overall NOx emissions), the controller may adjust or update one or more parameters of the model (e.g., the SCR model 124, the GT model 130, the multivariable model 154) used in controlling process (block 188), for example, using the estimator 156. Afterwards, the method 170 may start over (e.g., from block 172).

Technical effects of the present disclosure include using an emission control system (e.g., the emission controller 12) to reduce the overall $NO_x$ emissions of the gas turbine system 10 by coordinating and regulating the $NO_x$ emissions of the gas turbine engine 14 and the aftertreatment system 18 (e.g., the SCR system 20) based on the $NO/NO_2$ ratio in the exhaust gas 38 exiting the gas turbine engine 14. This may allow the gas turbine system 10 to meet the $NO_x$ emissions requirement. The present disclosure also includes a model-based estimation system (e.g., the estimator 156) capable of estimating the model parameters used by the emission controller, thereby allowing updating the parameters at different working sites, where different aftertreatment system 18 may be employed, and/or with respect to time. The estimation system may thus result in more accurate model performance and allow application of robust model-based control strategies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an emissions control system, comprising a processor programmed to
receive one or more selective catalytic reduction (SCR) operating conditions for an SCR system, wherein the SCR system is included in an aftertreatment system for an exhaust stream;
receive one or more gas turbine operating conditions for a gas turbine engine, wherein the gas turbine engine is configured to direct the exhaust stream into the aftertreatment system;
derive an ammonia ($NH_3$) flow to the SCR system based on an SCR model and the one or more SCR operating conditions;
derive a nitrogen oxide (NO)/nitrogen oxides ($NO_x$) ratio; and
derive a fuel split for the gas turbine engine based on the NH3 flow, the $NO/NO_x$ ratio or a combination thereof; and
control the gas turbine engine based on the derived fuel split.

2. The system of claim 1 comprising;
a bottoming cycle configured to receive the exhaust stream and to convert the exhaust stream into a mechanical or electrical power, wherein the aftertreatment system is included in the bottoming cycle.

3. The system of claim 1, wherein the emission control system comprises an aftertreatment controller and a gas turbine controller, and wherein the aftertreatment controller is configured to receive the one or more SCR system operating conditions; and to derive the $NH_3$ flow to the SCR;

and wherein the gas turbine controller is configured to receive the one or more gas turbine operating conditions; to derive the NO/NOx ratio; and to derive the fuel split for the gas turbine engine.

4. The system of claim 1, wherein the processor is programmed to derive the NO/NOX ratio by executing an SCR map.

5. The system of claim 1, wherein the processor is programmed to derive the NH3 flow by using a NH3 slip setpoint and the SCR model as inputs.

6. The system of claim 1, wherein the processor is programmed to derive the NH3 flow by using a NH3 slip setpoint and a measured NH3 slip as inputs.

7. The system of claim 1, wherein the processor is programmed to execute an estimator system configured to update the SCR model based on one or more measured outputs of the aftertreatment system.

8. The system of claim 7, wherein the processor is programmed to update the SCR model by updating one or more parameters of the SCR model.

9. The system of claim 8, wherein the one or more parameters comprise characteristics of a catalyst used in the SCR system.

10. A method comprising:
receiving one or more selective catalytic reduction (SCR) system operating conditions for an SCR system, wherein the SCR system is included in an aftertreatment system for an exhaust stream;
receiving one or more gas turbine operating conditions for a gas turbine engine, wherein the gas turbine engine is configured to provide the exhaust stream into the aftertreatment system;
deriving an ammonia ($NH_3$) flow to the SCR system based on an SCR model and the one or more SCR system operating conditions;
deriving a nitrogen oxide (NO)/nitrogen oxides ($NO_x$) ratio; and
deriving a fuel split for the gas turbine engine based on the $NH_3$ flow, the NO/$NO_x$ ratio, or a combination thereof.

11. The method of claim 10, wherein deriving the NO/$NO_x$ ratio comprises deriving the NO/$NO_x$ ratio by executing an SCR map.

12. The method of claim 10, wherein deriving the $NH_3$ flow comprises deriving the $NH_3$ flow by using a $NH_3$ slip setpoint and the SCR model as inputs.

13. The method of claim 10, wherein deriving the $NH_3$ flow comprises deriving the $NH_3$ flow by using a $NH_3$ slip setpoint and a measured $NH_3$ slip as inputs.

14. The method of claim 10, comprising executing an estimator system to update the SCR model based on one or more measured outputs of the aftertreatment system.

15. The method of claim 14, wherein executing the estimator system to update the SCR modelcomprises executing the estimator system to update one or more parameters of the SCR model.

16. A system comprising:
a gas turbine engine configured to combust a fuel to produce a first power;
a bottoming cycle fluidly coupled to the gas turbine engine and configured to receive an exhaust stream of the gas turbine engine to produce a second power;
a selective catalyst reduction (SCR) system disposed in the bottoming cycle and configured to receive the exhaust stream and to remove NOx from the exhaust stream; and
a controller comprising a processor programmed to
receive one or more SCR system operating conditions;
receive one or more gas turbine operating conditions;
derive an ammonia ($NH_3$) flow to the SCR system based on an SCR model and the one or more SCR system operating conditions;
derive a nitrogen oxide (NO)/nitrogen oxides (NOx) ratio; and
derive a fuel split for the gas turbine engine based on the $NH_3$ flow, the NO/$NO_x$ ratio, or a combination thereof.

17. The system of claim 16, wherein the processor is programmed to derive the $NH_3$ flow by using a $NH_3$ slip setpoint and the SCR model as inputs.

18. The system of claim 16, wherein the processor is programmed to derive the $NH_3$ flow by using a $NH_3$ slip setpoint and a measured $NH_3$ slip as inputs.

19. The system of claim 16, wherein the processor is programmed to execute an estimator system configured to update the SCR model based on one or more measured outputs of the SCR system.

20. The system of claim 16, wherein the controller comprises an aftertreatment controller and a gas turbine controller, and wherein the aftertreatment controller is configured to receive the one or more SCR system operating conditions; and to derive the $NH_3$ flow to the SCR system; and wherein the gas turbine controller is configured to receive the one or more gas turbine operating conditions; to derive the NO/$NO_x$ ratio; and to derive the fuel split for the gas turbine engine.

\* \* \* \* \*